United States Patent
Herz

(10) Patent No.: US 10,574,933 B2
(45) Date of Patent: Feb. 25, 2020

(54) SYSTEM AND METHOD FOR CONVERTING LIVE ACTION ALPHA-NUMERIC TEXT TO RE-RENDERED AND EMBEDDED PIXEL INFORMATION FOR VIDEO OVERLAY

(71) Applicant: Sling Media L.L.C., Foster City, CA (US)

(72) Inventor: William Herz, Hayward, CA (US)

(73) Assignee: Sling Media L.L.C., Foster City, CA (US)

( * ) Notice: Subject to any disclaimer, the term of this patent is extended or adjusted under 35 U.S.C. 154(b) by 0 days.

(21) Appl. No.: 16/353,970

(22) Filed: Mar. 14, 2019

(65) Prior Publication Data

US 2019/0215475 A1 Jul. 11, 2019

Related U.S. Application Data

(63) Continuation of application No. 15/940,770, filed on Mar. 29, 2018, now Pat. No. 10,250,838.

(Continued)

(51) Int. Cl.
| | |
|---|---|
| *H04N 5/445* | (2011.01) |
| *H04N 5/44* | (2011.01) |
| *H04N 7/18* | (2006.01) |
| *H04N 21/4402* | (2011.01) |
| *G06T 1/00* | (2006.01) |

(Continued)

(52) U.S. Cl.
CPC ..... *H04N 5/44504* (2013.01); *G06F 16/7844* (2019.01); *G06F 16/90348* (2019.01); *G06K 9/00724* (2013.01); *G06K 9/325* (2013.01); *G06K 9/344* (2013.01); *G06T 1/0007* (2013.01); *G06T 11/60* (2013.01);

(Continued)

(58) Field of Classification Search
CPC ...... H04N 5/44504; H04N 5/445; H04N 5/44; H04N 9/74; H04N 21/440236; H04N 7/181; H04N 7/18; H04N 7/188; G06F 17/30988; G06K 9/344; G06T 1/0007
USPC ....... 348/157, 725, 143, 563, 564, 578, 584, 348/589, 586, 600; 382/161, 290, 292, 382/301; 715/700, 716, 717, 861; 725/113

See application file for complete search history.

(56) References Cited

U.S. PATENT DOCUMENTS

| | | |
|---|---|---|
| 10,250,838 B1 | 4/2019 | Herz |
| 2004/0073941 A1 | 4/2004 | Ludvig et al. |

(Continued)

OTHER PUBLICATIONS

U.S. Appl. No. 15/940,770, filed Mar. 29, 2018 Notice of Allowance dated Nov. 15, 2018, all pages.

*Primary Examiner* — Sherrie Hsia

(57) ABSTRACT

Systems and methods for converting live action alpha-numeric text to re-rendered and embedded pixel information for video overlay. For example, a computer-implemented method may include converting a captured image of alpha-numeric characters into ASCII code, transmitting the ASCII code to a hub, capturing a video stream, generating a first output video stream, wherein the first output video stream includes the captured video stream and an overlay including the ASCII code, converting a captured image of a second set of alphanumeric characters into an ASCII code, transmitting the ASCII code to the hub, generating an updated output video stream, wherein the updated output video stream includes the captured video stream and an updated overlay including the ASCII code, and transmitting the updated output video stream for display.

16 Claims, 9 Drawing Sheets

Related U.S. Application Data

(60) Provisional application No. 62/611,820, filed on Dec. 29, 2017.

(51) Int. Cl.
| | | |
|---|---|---|
| *G06K 9/34* | (2006.01) | |
| *G06F 16/903* | (2019.01) | |
| *G06F 16/783* | (2019.01) | |
| *G06K 9/32* | (2006.01) | |
| *G06K 9/00* | (2006.01) | |
| *H04N 21/431* | (2011.01) | |
| *G06T 11/60* | (2006.01) | |

(52) U.S. Cl.
CPC . *H04N 21/4316* (2013.01); *H04N 21/440236* (2013.01); *G06K 2209/01* (2013.01); *G06T 2200/24* (2013.01)

(56) References Cited

U.S. PATENT DOCUMENTS

| | | |
|---|---|---|
| 2005/0177862 A1 | 8/2005 | Chen |
| 2009/0059007 A1 | 3/2009 | Wagg et al. |
| 2016/0086056 A1 | 3/2016 | Hosabettu et al. |

SYSTEM AND METHOD FOR CONVERTING LIVE ACTION ALPHA-NUMERIC TEXT TO RE-RENDERED AND EMBEDDED PIXEL INFORMATION FOR VIDEO OVERLAY

CROSS-REFERENCE TO RELATED APPLICATIONS

This application is a continuation of U.S. Non-Provisional application Ser. No. 15/940,770, filed Mar. 29, 2018, which claims priority to U.S. Provisional Application No. 62/611,820, filed Dec. 29, 2017, the entire disclosures of which are hereby incorporated by reference for all purposes.

TECHNICAL FILED

The present disclosure relates to capturing live action video data. More specifically, the present technology is directed to overlaying numeric and other kinds of text onto a multiple-input video stream output.

BACKGROUND

The use of media data such as video data has increased rapidly. Media data is used for various purposes, including to record and view sports events, for home security, to capture personal and family events, to sell real estate, for streaming, among others. Video data becomes even more flexible and useful when data captures an environment from multiple locations or angles. Users may wish to mix this data from multiple input data streams into a single output data stream to view immediately, to stream, or to store for later viewing.

SUMMARY

Embodiments of the present technology include systems and processes associated with converting live action alpha-numeric text to re-rendered and embedded pixel information for video overlay. For example, a computer-implemented method may include automatically detecting, at an imaging sensor on a network located in an environment of an entertainment venue, a set of alphanumeric characters on a display device; capturing, using the imaging sensor, an image of a first set of alphanumeric characters; converting the image of the first set of alphanumeric characters into an ASCII code associated with the first set of alphanumeric characters, and transmitting the ASCII code associated with the first set of alphanumeric characters to a hub on the network; capturing, using a video capture device located in the environment, a captured video stream, wherein the captured video stream includes video data associated with the entertainment venue; generating, using the hub, a first output video stream, wherein the first output video stream includes the captured video stream and an overlay including the ASCII code associated with the first set of alphanumeric characters; transmitting, using the hub, the first output video stream, wherein after the first output video stream is transmitted, the first output video stream is displayed on a computing device; capturing, using the imaging sensor, an image of a second set of alphanumeric characters; converting the image of the second set of alphanumeric characters into an ASCII code associated with the second set of alphanumeric characters, and transmitting the ASCII code associated with the second set of alphanumeric characters to the hub; generating, using the hub, an updated output video stream, wherein the updated output video stream includes the captured video stream and an updated overlay including the ASCII code associated with the second set of alphanumeric characters; and transmitting, using the hub, the updated output video stream, wherein after the updated output video stream is transmitted, the updated output video stream is displayed on a computing device instead of the first output video stream. The above steps may be implemented as instructions stored in a computer-readable medium, computer program product, or device such as a television receiver, or in other types of embodiments.

Figure 1:
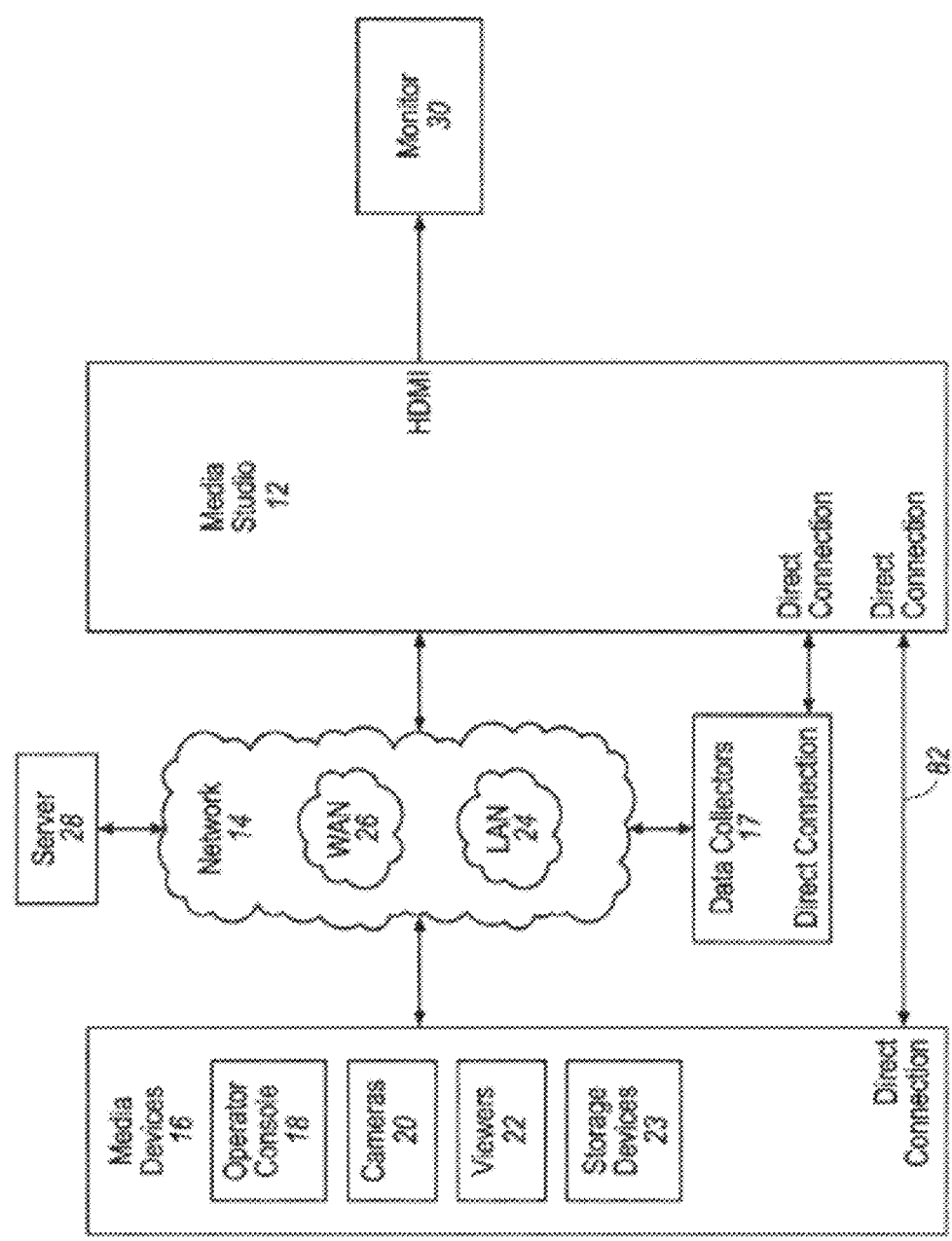
FIG. 1 illustrates a block diagram of an example media processing system for capturing and mixing multiple media streams into an output media stream, according to embodiments of the present technology.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The present disclosure relates to capturing live action video data. More specifically, the present technology is directed to overlaying numeric and other kinds of text onto a multiple-input video stream output.

The present disclosure is directed to a media studio and processing system that allows a user to capture video or other types of media data associated with live events from multiple different angles or locations. The media studio allows for the user to preview multiple media input items (e.g., simultaneously on a display), generating a media output item based on the multiple media input items, sharing the media output item, and/or storing the media output item for future viewing. All of these actions may be taken using a remote operator console communicatively connected to the media studio. The media studio may be programmed to generate recommendations for the media output item and/or generate the media output item directly based on predetermined rules.

The media studio may receive data from data collectors (e.g., one or more sensors, such as video capturing devices) mounted on or in a media device (e.g., a camera, mobile device, etc.). The data may be received directly from the data collectors, or indirectly, for example via metadata associated with the media input items. The selection of media input items for inclusion in the media output item may be based in part on the data from the data collectors or analysis of that data.

In one example, the media studio may be located at an event, such as a sporting event. Media devices may be placed at different locations or angles and capture data, via their data collectors, associated with the sporting event. The sporting event may include various other types of data associated with it other than video data of the event itself, such as a scoreboard (e.g., with a score, time clock, player information, game information, etc.), player jerseys, a shot clock, fan information, among other data. However, while this data may be important or useful, it may not be efficient for the media studio to dedicate a media device for capturing that information since the media device may be expensive or since the media device may generate an input item (e.g., input video data stream) that requires large amounts of bandwidth to transmit via a network, among other reasons. Therefore, an alternative data capture device (e.g., a monochromatic camera) may be used to capture that data so that the other media devices are free to capture video data of the event.

FIG. 1 illustrates a block diagram of an example media processing system for capturing and mixing multiple media streams into an output media stream, according to embodiments of the present technology. As shown in FIG. 1, the media processing system 10 may include a media studio 12, one or more media devices 16, and one or more data collectors 17. The one or more media devices 16 include the operator console 18, and may further include one or more cameras 20, one or more viewers 22, and one or more media storage devices 23. The media devices 16 and the data collectors 17 may be remote or local to the media studio 12 and may be coupled to the media studio 12 via at least one of the network 14 and a direct wired or wireless connection 82.

The media processing system 10 may include a mobile media studio 12, which can receive media input data from one or more media devices 16. The media input data may be received from the one or more media devices 16 via one or more wired and/or wireless networks 14 and one or more wired and/or wireless direct connections. Receiving media data may include receiving media data sent from a media device 16 (e.g., a camera 20) or retrieving data (e.g., from a storage device 23). Additionally, the media studio 12 may receive data from one or more data collectors 17. The data collectors 17 may include a variety of sensors that may provide data related to a recording event. The data collectors 17 may include one or more biometric sensors such as heart rate monitors, blood pressure monitors, etc.; movement sensors such as accelerometers, gyroscopes, etc.; location sensors such as global positioning systems, RFID tags, etc.; environmental sensors such as barometers, thermometers, light sensors, etc.; and other types of sensors which may provide data related to a recording event. The data collectors 17 may further include systems such as global positioning systems (GPS), weather tracking systems, etc.

As used herein, the recording event may refer to the actual event being recorded, for example, a football game or company picnic, including the environment, participants, camera 20 operators, media studio 12 operators, operator console 18 operators, viewers, audience, etc. related to the event being recorded. Further, the data collectors 17 may provide data, or may be included in one or more of the media devices 16, and provide data via, for example, a computing device in the media device 16.

The media studio 12 can be controlled by, and receive media input data from, an operator console 18, which may be remote to the media studio 12. The media studio 12 further can generate media output data and provide the media output data to media devices 16 (e.g., a viewer 22). The media processing system 10 allows a user to produce media output data at a location where the recording, or a portion of the recording, is taking place. Controlling the media studio 12 via a remote operator console 18 provides the user the freedom to move about the recording location while maintaining oversight and control over the production process.

A server 28 may also be communicatively coupled to the media studio 12, the media devices 16, and/or the data collectors 17 via the network 14. Additionally, the media processing system 10 may include a monitor 30, which may include a display device, communicatively coupled to the media studio 12.

A variety of types of data may be used by the media studio. For example, the data may include biometric data (e.g., heart rate, blood pressure, etc.) associated with a user of a camera and which may be used, e.g., to determine an excitement level of the user. As another example, the data may be data indicative of the quality of a media input item such as steadiness of a camera, contrast of an image, etc. Still further, the data may include location data or movement data associated with an object or participant in the event to be recorded (e.g., a player in a sports event, a ball being used in a sports event, etc.). Still further, the data may include global positioning data, weather data, light conditions, etc. related to the recording environment. Other types of data, collected from sensors, or, e.g., from other computing devices, may also be used for selecting the content for and/or generating the media output item.

The media studio 12 can receive multiple media input items simultaneously or substantially simultaneously, and can combine them into an aggregated media item for viewing via the operator console 18. An "aggregated media item," as that term is used herein, is a set of two or more of the media input items, arranged to be displayed at the same time on a user display (e.g., a touchscreen or other screen with projected or overlaid images). The media input items may be arranged such that they appear side by side, in rows, or in a picture-in-picture format within the user display. In addition, the aggregated media item may include, for example, a graphical user interface that is displayed on the user display and accepts user inputs. As described below, the media studio 12 may compress the aggregated media item prior to providing it to the operator console 18.

The media input items may be visual and/or audio data such as videos captured by a video camera or sounds captured by a microphone. The microphone may be integrated in a media device 16 or another device within media processing system 10, or may be a standalone media device 16 which can independently communicate with the media studio 12. The media input items may include, for example, streamed data or static data such as single digital photographs. The media studio 12 further can receive commands from the operator console 18, and can generate a media output item according to the received commands. The media output item may include data from one or more of the media input items.

As an example, the media studio 12 may receive four media input items, each of the four media input items received from a different media device 16. The media studio 12 may generate an aggregated media item including each of the four media input items, and transmit the aggregated media item to the operator console 18. A user of the operator console 18 may select, via a user interface, one of the four views in the aggregated media item to be included in the media output item. Based on a command received from the operator console 18, the media studio 12 may generate the media output item that includes the selected media input item. The media output item may be transmitted via a network 14 to be shared with viewers (e.g., streamed on an online streaming platform), or stored in a storage device 23. In one example embodiment, media studio 12 may be capable of only receiving and processing four media input items at a time. For example, media studio 12 may only include four video feeds or streams due to, for example, a limited number of inputs on media studio 12 or a limited amount of bandwidth utilization on the network that connects media studio 12 to media devices 16.

In addition to selecting one or more media input items to be included in the media output item, the media studio 12 may perform various media processing operations. The media processing operations may be performed based on commands received from the operator console. A non-limiting list of example processing operations that may be performed by the media studio 12 includes scaling, mixing, morphing, compositing, adding overlays (audio and/or video), among others. In addition, the media studio may perform operations such as object tracking, image stabilization, etc. The operation of the media studio 12 will be discussed in greater detail below.

The media studio 12 may further be programmed to recommend (e.g., to the operator console 18) media input items to be included in a media output item and/or to generate a media output item based on one or more predetermined rules. The predetermined rules may be, for example, inputted by a user. Alternatively or in addition, the predetermined rules may be dynamically learned over time by collecting and analyzing historical data of previous operator choices. For example, a processor included in the media studio 12 may be programmed to learn user preferences based on historical/previous choices and may include a hardware learning mechanism such as a neural network.

Communications between the media studio 12 and the media devices 16 and data collectors 17 (collectively, "networked devices" 16, 17) may occur via the network 14 and/or via one or more of direct connections 82 (e.g., wired and/or wireless connections, such as, for example, Bluetooth, IEEE 802.11, etc.). In general, the network 14 represents one or more mechanisms for delivering media content between the media studio 12 and the networked devices 16, 17. Accordingly, the network 14 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Example communication networks include wireless communication networks, local area networks (LAN) 24 such as a WiFi network or Ethernet, and/or wide area networks (WAN) 26 such as the Internet, etc.

In addition to the one or more networks 14, one or more wired or wireless direct connections 82 may be used to connect the media studio 12 to the media devices 16 or other devices in the media processing system 10. Direct connections may include, e.g., Bluetooth, Universal Serial Bus (USB), high-definition multimedia interfaces (HDMI), custom serial interfaces, etc. For example, one or more high-definition multimedia interfaces (HDMI) may be used to transfer data between a media device 16 and the media studio 12, or from the media studio 12 to a computer or television monitor or other display 30. The HDMI is a well-known proprietary audio/video interface for transferring uncompressed video data and compressed or uncompressed digital audio data from a HDMI-compliant source device, such as the media device 16, to a digital media processing device such as the media studio 12 or to the compatible computer monitor (e.g., a monitor 30).

The server 28 may be communicatively coupled to the media studio 12, the media devices 16, and/or the data collectors 17 via the network 14. The server 28 may include a communications circuit for communicating via the network 14, and may further include a memory and one or more processors configured to execute programs (i.e., sets of computer-executable instructions) stored in memory. The server 28 may, for example, receive media output items and store the media output items for future use.

Media content, such as the media input items, media output items, and/or multiview media items, may generally be delivered via the network 14 in a digital format (e.g., as compressed audio and/or video data) and may include media data and metadata. For example, MPEG refers to a set of standards generally promulgated by the International Standards Organization/International Electrical Commission Moving Picture Experts Group (MPEG). H.264 refers to a standard promulgated by the International Telecommunications Union (ITU). Accordingly, by way of example and not limitation, media content may be provided in a format such as the MPEG-1, MPEG-2, or the H.264/MPEG-4 Advanced Video Coding standards (AVC) (H.264 and MPEG-4 at present being consistent), or according to some other standard or standards. For example, media content could be audio data formatted according to standards such as MPEG-2 Audio Layer III (MP3), Advanced Audio Coding (AAC), etc. Further, the foregoing standards generally provide for including metadata.

As noted, media devices 16 may include the viewer 22 and may be used to display media output data received from the media studio 12, and may include a display such as a liquid crystal display (LCD) or plasma display. The media data may be received, for example, via the network 14 or via the direct connection 82. Examples of the viewer 22 include mobile devices such as mobile phones, tablets, and laptops and may further include devices such as digital televisions. The viewer 22 may receive, e.g., Full HD data, providing a resolution of 1920 by 1080. Data formats with other resolutions may also be used.

As further noted, media devices 16 may also include a storage device 23. Storage device 23 may store media data and provide an interface to allow the media studio 12 to access the data via the network 14 or via the direct connection 82. The media storage device may include one or more types of data storage such as read only memory (ROM), random access memory (RAM), flash memory, electrically programmable memory (EPROM), electrically programmable and erasable memory (EEPROM), embedded MultiMediaCard (eMMC), a hard drive, etc. Further, the media storage device 23 may include a processor, programmed to receive commands from the media studio 12. The processor may be further programmed, based on the commands, to retrieve media data items from data storage and send the media data items to the media studio 12.

Communications between the media studio 12 and the viewers 22/storage device 23 may be performed via the network 14. Additionally or alternatively, communications may be performed via the direct connection 82. For example, the storage device 23 may be connected to the media studio 12 via a Universal Serial Bus (USB) port, or other wired or wireless interface.

Figure 2:
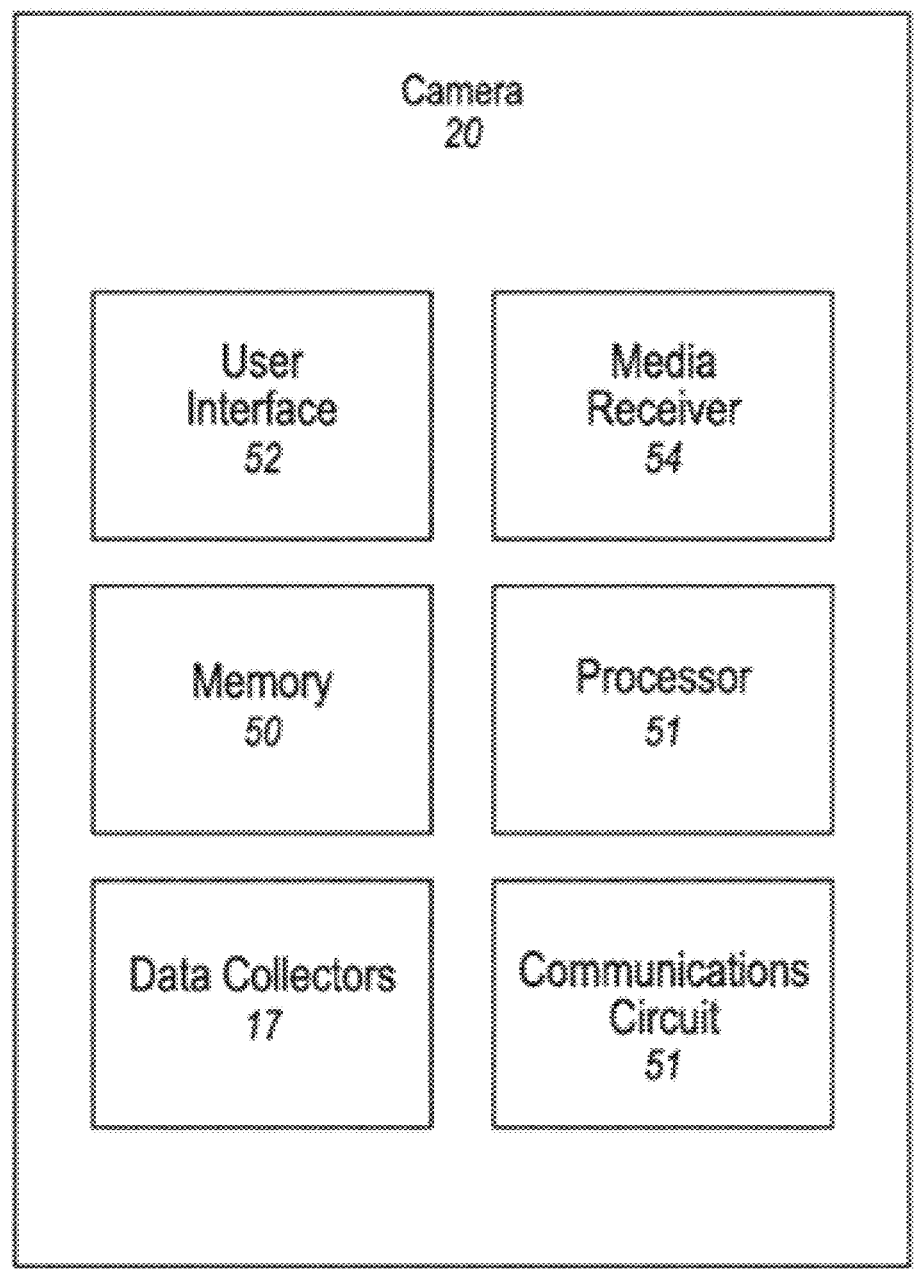
FIG. 2 illustrates a block diagram of an example camera for the media system of FIG. 1, according to embodiments of the present technology.

FIG. 2 illustrates a block diagram of an example camera for the media system of FIG. 1, according to embodiments of the present technology. The camera 20 may include a memory 50 and a processor 51, the memory 50 storing program code (i.e., computer-executable instructions) executable by the processor 51. The memory 50 may include video buffers which may be used for replays, applying video or audio filters, and/or compressing and decompressing media data, among others. The processor 51 may be communicatively coupled to a user interface 52, a media receiver 54, a communications circuit 56, and/or data collectors 17. The camera 20 may capture media data (i.e., visual and sound data such as photographs and videos) and may transmit the media data via, for example, the network 14, to the media studio 12. Examples of a camera 20 include portable devices such as smartphones, tablets, laptops, digital cameras, security cameras, traffic cams, cameras transported by airborne drones, among others.

The media receiver 54 may include one or more data receiving elements for receiving media data. The collected media data may include visual data and/or audio data. The media receiver 54 may include, for example, one or more microphones for receiving sound data and CMOS or CCD image sensors for receiving image data.

The user interface 52 may be communicatively coupled to the processor 51 and may include one or more input devices such as a microphone, buttons, a touchscreen display, a mouse, a keyboard, a gesture-recognition device, switches, etc., for receiving input from the user. The user interface 51 may further include one or more output devices such as a display, lamps, speakers, etc. for communicating information to the user.

The data collectors 17, which may be in addition to the data collectors 17 shown in FIG. 1, may be used to determine, for example, operating conditions of the camera 20. Data collectors 17 may include accelerometers, gyroscopes, light meters, among others. The data collectors 17 may be used to measure, for example, movement of the camera 20 (shaking, tracking of an object), the direction the camera 20 is pointing, the light conditions under which the camera 20 is operating, etc. The data collectors 17 may provide data to the processor 51, which may, for example, send the data to the media studio 12 for additional processing. The data sent to the media studio 12 may be raw data, i.e., representative of data coming directly from sensors.

The camera 20 may receive data from, for example, the media studio 12. The camera 20 may also provide data to a user of camera 20 via, for example, the user interface 52. For example, the media studio 12 may determine, based on data received from the camera 20, that there is a problem with camera 20. For example, media studio 12 may determine that the camera 20 is shaking too much. Media studio 12 may make this determination by comparing received media input to a predetermined or dynamically determined (e.g., based on historical data collected over time) threshold. The media studio 12 may send this data to the camera 20, which may display the information on the user interface 52.

Figure 3:
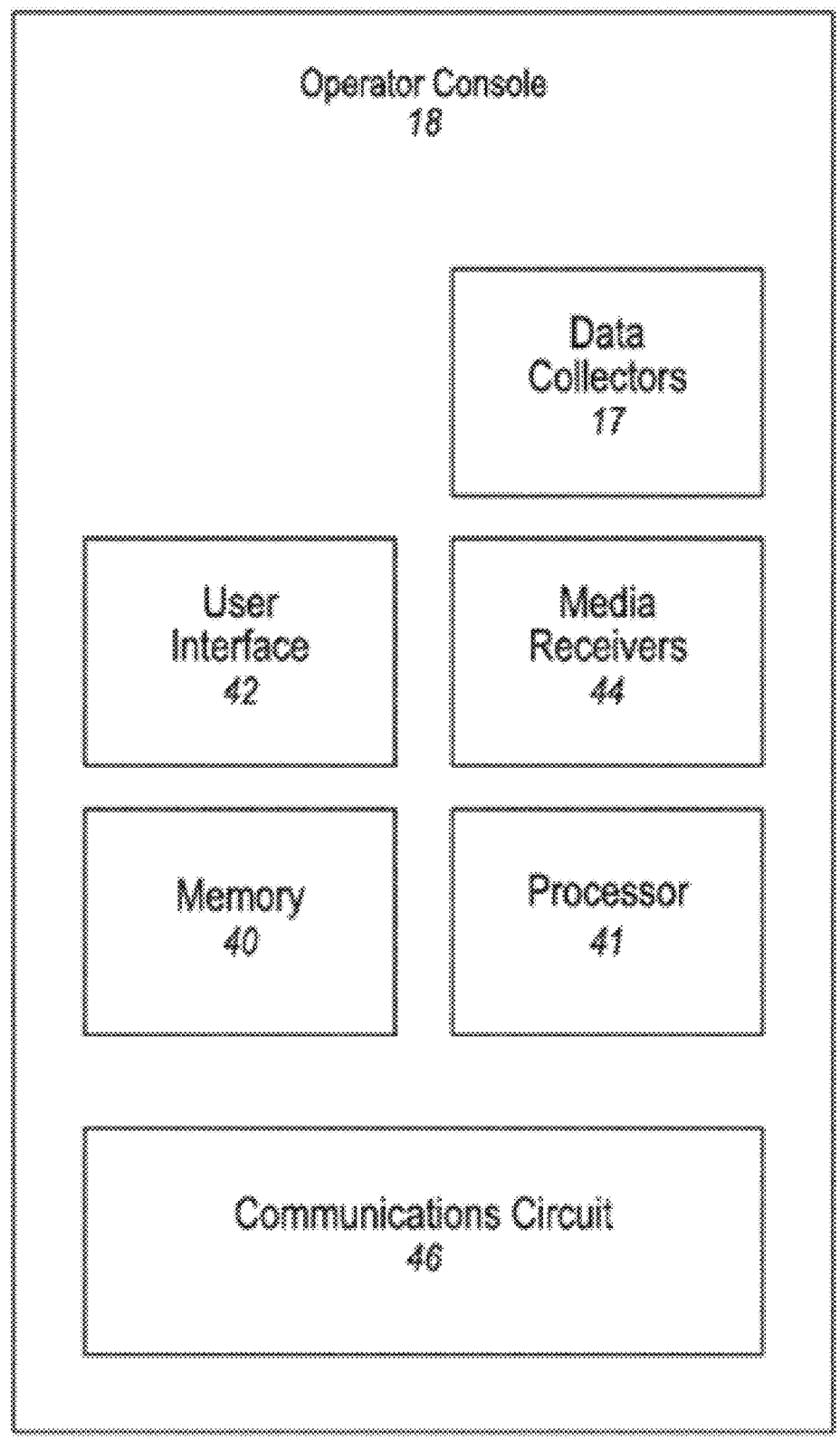
FIG. 3 illustrates a block diagram of an example operator console for the media processing system of FIG. 1, according to embodiments of the present technology.

FIG. 3 illustrates a block diagram of an example operator console for the media processing system of FIG. 1, according to embodiments of the present technology. The operator console 18 may be used to control the operation of the media studio 12. As shown in FIG. 3, the operator console 18 may include a processor 41 and/or a memory 40 (e.g., to store program code, i.e., computer-executable instructions executable by the processor 41). The processor 41 and/or memory 40 may be communicatively coupled to a user interface 42, a media receiver 44, a communications circuit 46, and/or data collectors 17.

The operator console 18 may include a user interface 42 may be communicatively coupled to the processor 41 and the user interface 42 may include one or more input devices such as a microphone, buttons, a touchscreen display, a mouse, a keyboard, a gesture-recognition device, switches, etc. for receiving input from the user. The user interface 42 may further include one or more output devices such as a display, lamps, speakers, etc. for communicating information to the user. All, or a portion of, the user interface 42 may be physically separate from the operator console 18. For example, the operator console 18 may be a tablet computer which projects its output to another screen (e.g., air-play) while the operator continues to control the media studio 12 from the tablet computer.

In addition to commands related to selecting media input items for display in the media output item, commands from the operator console 18 may include instructions to perform operations such as scaling, mixing, morphing, compositing, adding overlays, etc. Further, commands from the operator console 18 may include instructions to perform operations such as object tracking, image stabilization, etc.

The operator console 18 may include one or more media receivers 44. A media receiver 44 may be, for example, a digital camera, which may receive media data. A media receiver 44 may include, for example, a CMOS or CCD image processor for receiving visual data and a microphone for receiving audio data. The media data may include visual data such a still photographs and video recordings and may further include audio data such as a sound recording or soundtrack. The media receiver 44 may, for example, output the media data to the processor 41.

The operator console 18 may include a communications circuit 46 that is communicatively coupled to the processor 41 and/or is configured to communicate with the media studio 12 via, for example, the network 14 and/or through the direct connections 82. The communications circuit 46 may include a radio frequency (RF) transceiver for WiFi communications (typically 2.4 GHz or 5 GHz bands). The RF transceiver may communicate, for example, directly with a RF receiver included in the media studio 12. Additionally or alternatively, the communications circuit 46 may include, e.g., an Ethernet interface, a Universal Serial Bus (USB) interface, a Bluetooth transceiver, a high-definition multimedia interface (HDMI), etc. Alternatively, the communications circuit 46 may communicate with the media studio 12 indirectly (e.g., via an intermediate device). For example, the communications circuit 46 may communicate with a hotspot.

The operator console 18 may include a processor 41. Processor 41 of the operator console 18 may perform processing of the data it receives from other parts of the operator console 18 (processor 41 may be communicatively coupled to each of the user interface 42, the data collector 44, the communications circuits 46, and the data collectors 17) or other media devices 16. For example, the processor 41 may determine values such an excitement level, a quality level, etc. of the data and provide the determined values to the media studio 12. The data may be dynamic data which indicates the determined values as a function of time. Further, the operator console 18 processor 41 may, e.g., recognize objects within the media input item, perform audio filtering, and perform other media processing operations, and provide the results of these operations to the media studio 12.

The processor 41 may be programmed to control the operation of the media studio 12 based on inputs received from a user via the user interface 42. More specifically, the processor 41 may be programmed to receive a media content item (for example, an aggregated media item including one or more views from one or more cameras 20) and to display the aggregated media item via the user interface 42. The processor 41 may be further programmed to receive input from the user via the user interface 42. For example, the user may view the aggregated media item and select one of the views to be included in a media output item generated by the media studio 12. The processor 41 may send a command to the media studio 12 to include the selected view in the media output item.

Figure 4:
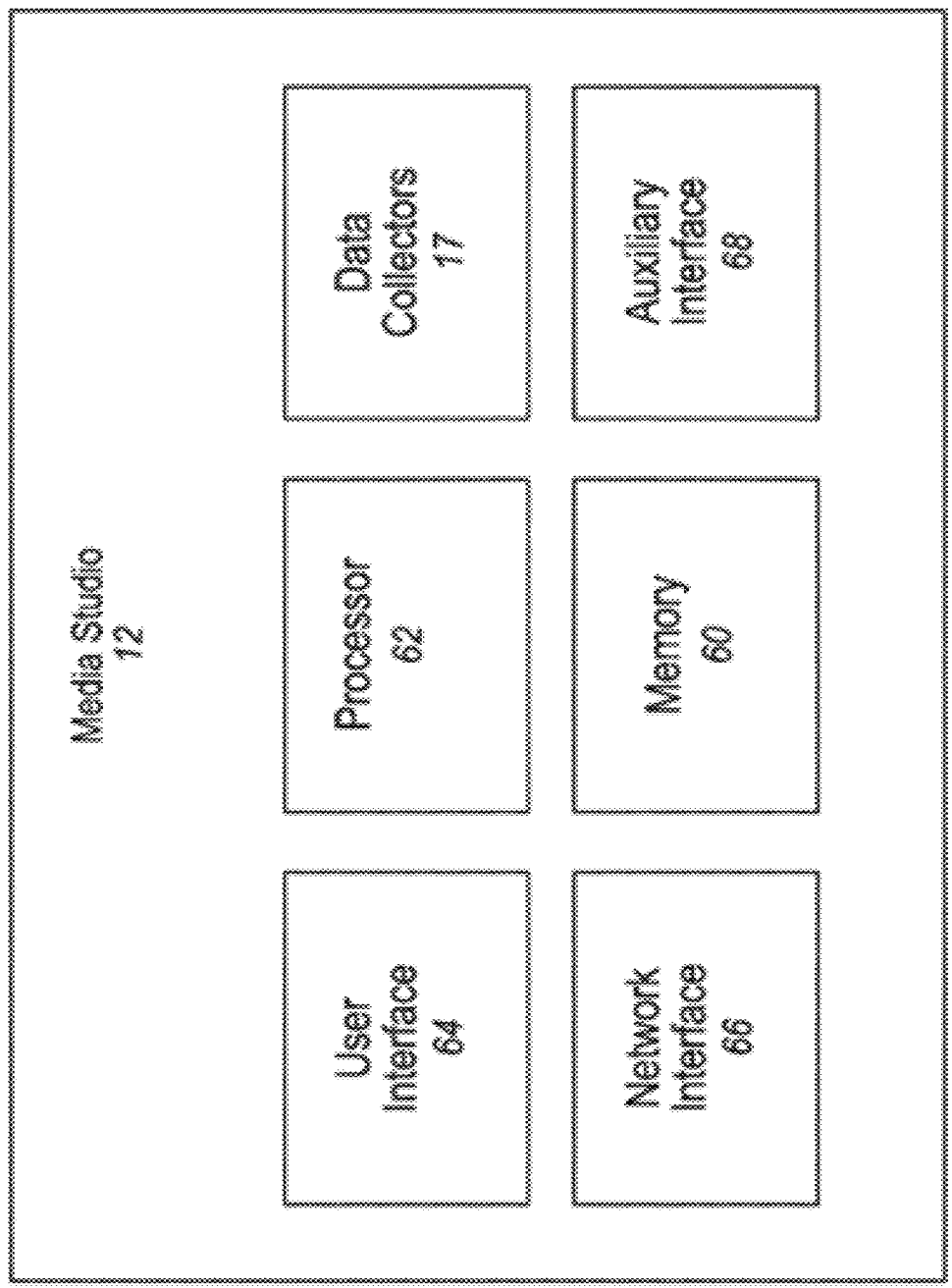
FIG. 4 illustrates a block diagram of an example media studio for the media processing system of FIG. 1, according to embodiments of the present technology.

FIG. 4 illustrates a block diagram of an example media studio for the media processing system of FIG. 1, according to embodiments of the present technology. The media studio 12 may include a processor 62 and an internal memory 60 (which, for example, may store program code, i.e., computer-executable instructions, executable by the processor 62). The processor 62 and/or internal memory 60 may be communicatively coupled to a user interface 64, a network interface 66, an auxiliary interface 58, and data collectors 17.

The internal memory 60 may include, for example, read only memory (ROM), random access memory (RAM), flash memory, electrically programmable memory (EPROM), electrically programmable and erasable memory (EEPROM), embedded MultiMediaCard (eMMC), a hard drive, among others, and may be used to store programs executable by the processor 62, as well as to store, for example, data representing inputs from the user, instructions received from the operator console 18, media data received from a remote media device 16, and/or media metadata, data collected by data collectors 17.

The user interface 64 may be communicatively coupled to the processor 62 and may include one or more output devices such as a display, lamps, speakers, etc. for communicating information to the user, such as an alarm or other notification. The user interface 64 may further include one or more input devices such as buttons, a microphone, a touchscreen display, a mouse, a keyboard, a gesture-recognition device, switches, etc. for receiving input from the user.

The network interface 66 may include one or more interfaces to the network 14. For example, the network interface 66 may include a hotspot, such as is known, for WiFi communications. The hotspot may include a router. The router may include a radio frequency (RF) transceiver for WiFi communications (typically 2.4 GHz or 5 GHz bands) and may receive multiple transmissions substantially simultaneously. The router may connect the processor 62 with media devices 16, such as those shown in FIG. 1. The router and an Internet client may also be used in combination to provide Internet access for media devices 16. Additionally, the network interface 66 may include a link to an Internet Service Provider (ISP). The link may be a mechanism for connecting to and communicating with the Internet Service Provider, such as, for example, satellite communications or a cable network. The link may include a transceiver and/or antenna for satellite communications (such as those, for example, in the Ka band, 18.3-30 GHz). The link to the ISP may receive, via the network 14, Internet protocol (IP) communications from, for example, media devices 16 and data collectors 17.

The auxiliary interface 68 may include one or more wired or wireless interface circuits which may be used, for example, to connect to one or more media devices 16. The auxiliary interface 68 may include a universal serial bus (USB) interface circuit to communicate with external USB devices, for example, a memory stick or memory back-up device. As another example, the auxiliary interface 58 may include a MicroSD interface, as is known, to store data on and retrieve data from a MicroSD data card. Further, the auxiliary interface 68 may include, for example, a Bluetooth interface for wireless connection to a media device 16. The auxiliary interface 68 may also be used to connect to data collectors 17.

Processor 62 may generally be programmed to receive one or more media input items from one or more media devices 16. Processor 62 may, for example, generate an aggregated media item. The aggregated media item may include, for example a picture-in-picture (PIP) display, wherein two or more of the media input items are displayed at the same time (e.g., side by side). The media studio 12 may transmit the aggregated media item via the network 14 to the operator console 18. Processor 62 may be further programmed to receive commands from the operator console 18. Based on the commands, the media studio 12 may generate a media output item. The processor 62 may select data from one or more of the media input items to include in the media output item. In addition, the media studio 12 may perform media processing operations based on predetermined rules for generating the media output item.

Referring back to previous figures, processor 62 may output the media output item to viewers 22, to the operator console 18, and/or to other display devices. Additionally or alternatively, the media studio 12 may output the media output item to a server 28, or to storage devices 23, where the media output item may be stored for future use.

Figure 5:
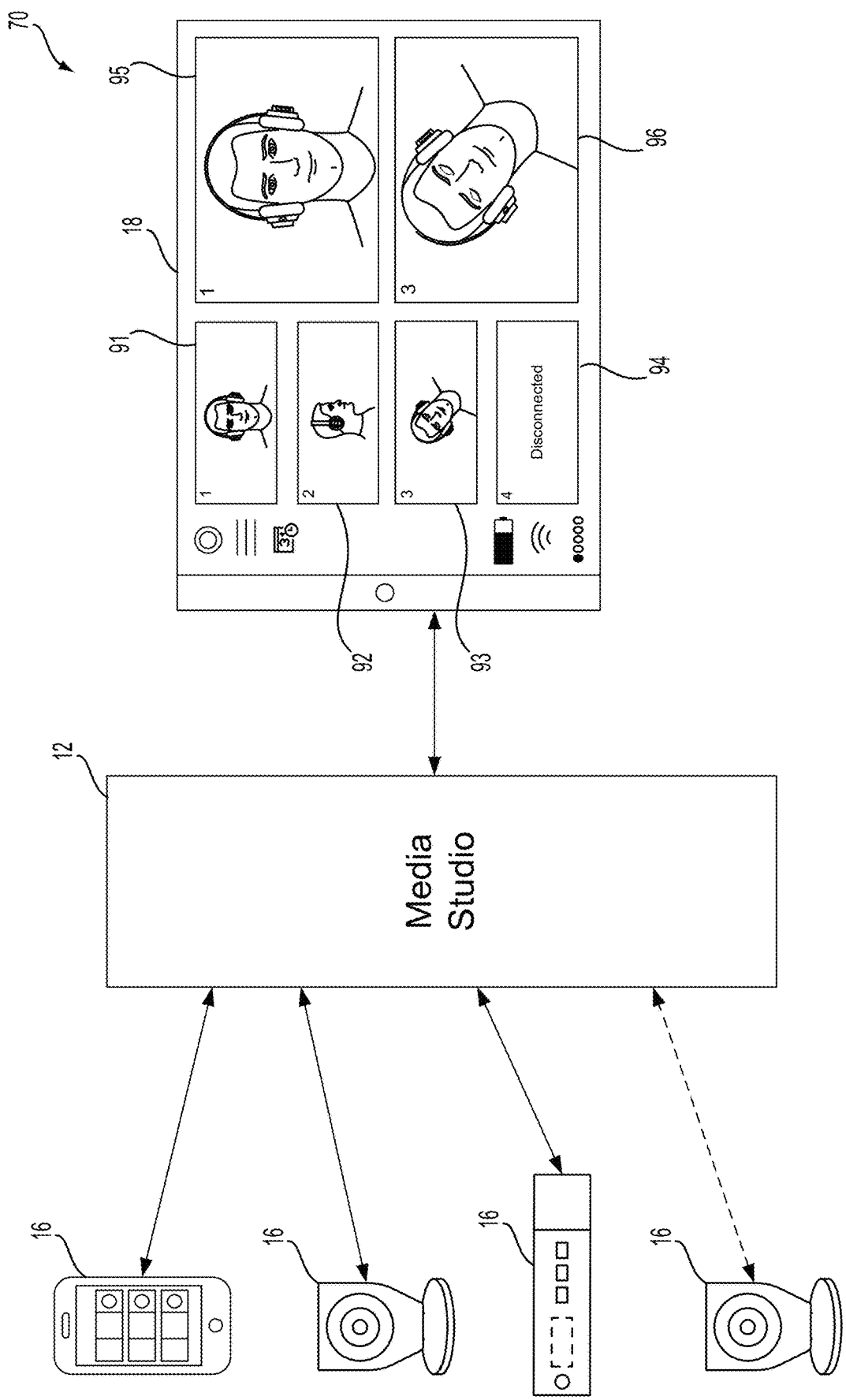
FIG. 5 illustrates an example media processing system for capturing and mixing multiple media streams into an output media stream, according to embodiments of the present technology.

FIG. 5 illustrates a block and flow diagram showing communication between media devices and an operator console via a media studio, according to embodiments of the present technology. As noted, a media processing system may include media devices (such as media devices 16), an operator console (such as operator console 18), and a media studio (such as media studio 12). More specifically, the media studio 12 may receive data and inputs from a variety of different sources, and use that data and inputs to produce an output for display. For example, the media studio 12 can receive multiple media input items simultaneously or substantially simultaneously, for example from media devices 16, and can combine them into an aggregated media item for viewing via the operator console 18. Furthermore, for example, the media studio 12 can be controlled by, and receive media input data from, an operator console 18, which may be remote from the media studio 12. The media studio 12 further can receive commands from the operator console 18, and can generate a media output item according to the received commands. For example, a user of the operator console 18 may select, via a user interface, one of the four views in the aggregated media item to be included in the media output item. Based on a command received from the operator console 18, the media studio 12 may generate the media output item that includes the selected media input item. In addition to commands related to selecting media input items for display in the media output item, commands from the operator console 18 may include instructions to perform operations such as scaling, mixing, morphing, compositing, adding overlays, etc. Further, commands from the operator console 18 may include instructions to perform operations such as object tracking, image stabilization, etc.

Operator console 95 may include a graphical user interface. The graphical user interface in operator console 95 includes six tiles or other items 91-96. When media studio 12 receives one or more media input items, the items may be displayed on operator console 18 in tiles 91-94. For example, a first media input item may be displayed on tile 91, a second media input item may be displayed on tile 92, a third media input item may be displayed on tile 93, and a fourth media input item may be displayed on tile 94. Media devices 16 may include four (or more or less) of the same device and may capture video or other media of an environment from different angles, or may be different devices that capture different types of media. In either instance, media input items captured from a media device 16 may be displayed on operator console 18. When fewer than four media devices 16 are connected to media studio 12, and therefore fewer than four media input items are received by media studio 12, one or more of tiles 91-94 may not display a media input item, and instead may be blank or otherwise indicate that no media input item has been received to be displayed on that tile.

Tiles 95 and 96 may be used for other purposes associated with operator console 18. For example, a user of the operator console 18 may select, via the graphical user interface, one of the four views in the aggregated media item to be included in the media output item (e.g., at tiles 91-94). When a user selects one of the four views, the media input item selected by the user may appear in, for example, tile 96. For example, tile 96 may be used by the user to manipulate the media input item before it is finalized as an media output item. The media output item may be broadcasted or streamed over the internet or otherwise shared. The media output item, once finalized, may be displayed in tile 95. Even though certain tiles within operator console 18 have been described, they are examples only. The tiles may be interchangeable, moveable, or used for different purposes as may be provided for by the software application being used by operator console 18 to present the tiles on the graphical user interface.

Figure 6:
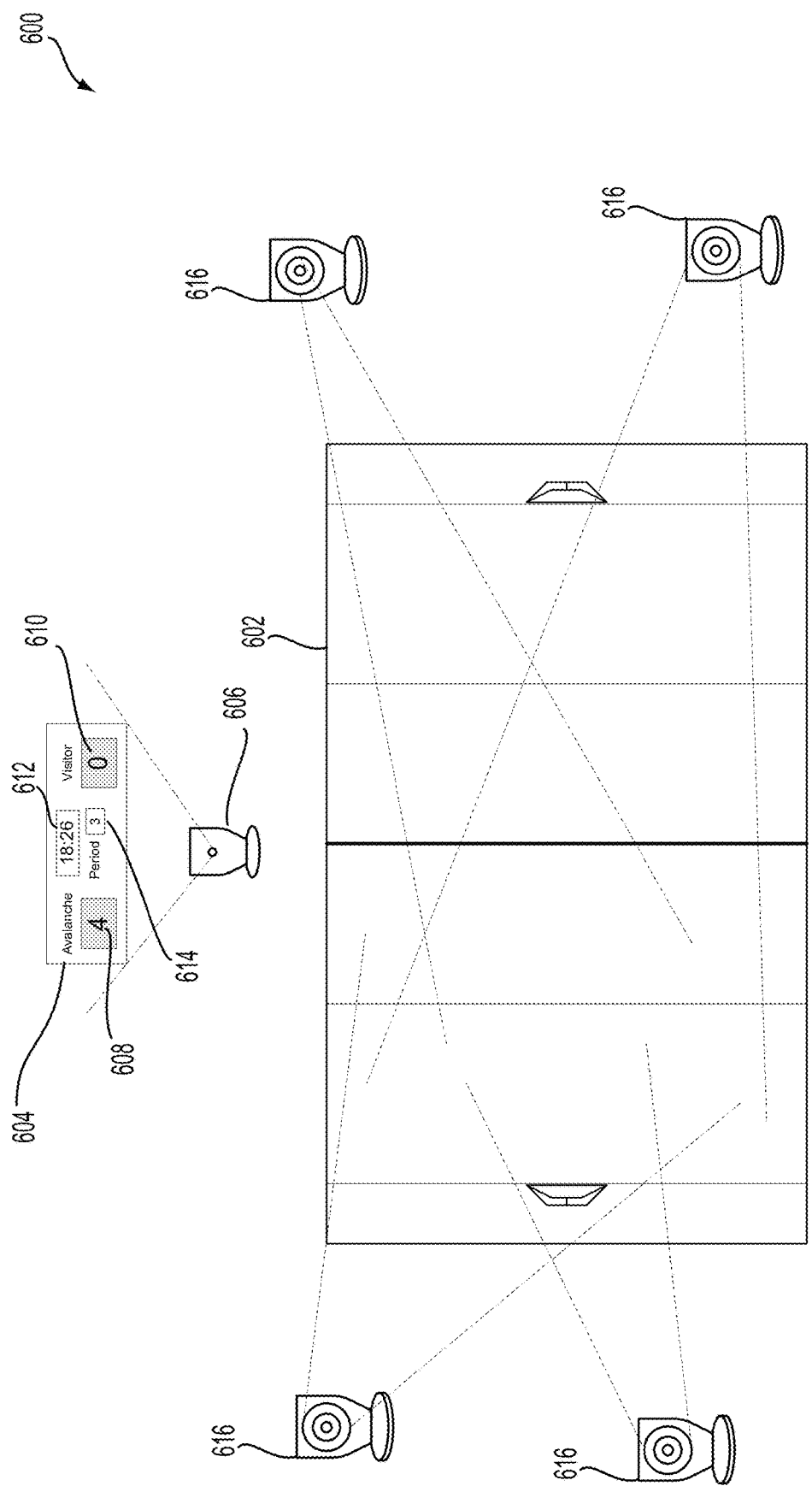
FIG. 6 illustrates an example environment including an entertainment venue, media devices capturing different angles of the environment, and a scoreboard associated with the entertainment venue, according to embodiments of the present technology.

FIG. 6 illustrates an example environment 600 including an entertainment venue 602, media devices 616 capturing different angles of the environment, and a scoreboard 604 associated with the entertainment venue, according to embodiments of the present technology. For example, the environment 600 may include a hockey rink/arena-type entertainment venue, as shown in FIG. 6. However, the environment 600 may include any other type of environment, whether a sporting venue or otherwise, and a hockey rink/arena is used just for an example. Media devices 616, which may be the same or similar to media devices 16 in FIGS. 1 and 5, may be present in the environment 600 so that they are in position to capture video of the environment, including, for example, the entertainment venue 602 and an event occurring on entertainment venue 602. As noted with respect to FIG. 5, any media input item generated by a media device 616 may be transmitted by the media device 616 to, for example, a media studio, such as media studio 16.

Environment 600 also includes a scoreboard 604. Scoreboard 604 includes a clock 610, which shows how much time is currently remaining in a period of the hockey game, a home (for the home team, the "Avalanche") score 608, which shows how many points (in this case, hockey goals) the home team currently has, a visitor score 608, which shows how many points (in this case, hockey goals) the visiting team currently has, and a period counter 614, which shows which period the game is currently in. Environment 600 also includes a camera 606, which is pointed at scoreboard 604. Camera 606 may be similar to cameras 616. However, camera 606 may also be different than cameras 616. For example, while cameras 616 may be smart cameras that include a processor, storage, and other capabilities, camera 606 may be any kind of imaging sensor capable of capturing an image of the scoreboard and transmitting data. Camera 606 may be a camera that is only capable of capturing an image and transmitting data. For example, camera 606 may be monochromatic, black and white, or other kinds of simple image capturing device that includes fewer features than cameras 616. In another example embodiment, camera 606 may be the same type of camera as cameras 616, but may be restricted and configured to only use certain basic features, such as capturing an image and transmitting data. Practically, camera 606 may be any kind of camera that is configured to capture an image of scoreboard 604 such that it may determine the alphanumeric characters on the scoreboard at a given time.

Camera 606 may be configured to transmit data, such as images it captures or data associated with the images it captures. Transmitting the image, or data associated with the image, may allow a media studio associated with the media processing system to overlay a scoreboard, using the data from camera 606, over a video feed at the media studio. In an example, camera 606 may be configured to capture an image of scoreboard 604, execute software (such as, for example, optical character recognition (OCR) software) stored on camera 606, and analyze data associated with the image. For example, analyzing data associated with the image may include comparing data associated with the image to data associated with other (e.g., previous) images captured by the camera 606, and determining whether the data associated with the later image is different. For example, determining that the data associated with two images, taken at different times, is different may allow a determination that the time, score, and/or period have changed on the scoreboard. Any of these procedures, including any actions other than capturing an image of the scoreboard 604 and transmitting data (e.g., to a media studio), may be performed by a device or network external to the camera 606. For example, camera 606 may capture an image and immediately transmit the image or data associated with the image to a media studio so that the media studio may complete these steps.

Detecting such changes, such as in a scoreboard of a game, may be useful in other ways as well. For example, events such as changes in scores may be tagged or bookmarked (i.e. event pointers can index when an event occurred in the production as determined by the scoreboard data for future utility such as cueing up highlights or editing) to navigate a production based on the ASCII codes or machine language. For example, at halftime of a game, a user may quickly find highlights to view or show during the halftime show. The user may quickly navigate to a scoring, penalty, or other event, and then may cue one or more of those events for replay. In post-production (i.e. editing), the user could also navigate based on events. For example, if the user only wanted to view the at-bats in a baseball game of a specific baseball player, the user may use tags, pointers, or other ASCII data to quickly find and then use for the edits.

The process of using OCR to analyze data associated with an image may include different types of OCR. For example, the OCR software may be configured to OCR dynamic light emitting or light transmissive sources, such as video on a display or light coming from a scoreboard. These techniques may be necessary since, in this embodiment, OCR would be performed on display screens, such as LCD, LED, or pixels. The associated pixels may not be well-defined, or as well-defined as on paper, a word processing application, or other well-defined pixels. This approach may be more complex, as it would deal with more of the optical characteristics of the display (media) and therefore more environmental factors, such as lighting, shaking, etc.

In order for camera 606 to capture an image of scores 607 and 610 of scoreboard 604, the lens of camera 606 must be pointing at scoreboard 604 and must capture the alphanumeric characters on the scoreboard. Camera 606 may not be pointing in exactly the right direction to capture this data when it captures images of the camera. Furthermore, different scoreboards are different shapes and sizes, causing necessary adjustment of the camera. The media processing system, which may include at least, for example, cameras 616, camera 606, and a media studio, may perform a pre-processing step that includes camera framing to confirm that the lens of camera 606 is pointing at scoreboard 604 so as to confirm that camera 606 is configured to capture an image of scoreboard 604, or adjust camera 606 (or its lens) if not. There are several different possible techniques of determining whether camera 606 is adequately pointed at the scoreboard such that camera 606 could capture an image of scores 608 and 610. First, camera 606 may capture an image, execute OCR software on the image to determine if the image (and therefore the scoreboard) includes alphanumeric characters similar to those that would be found in a scoreboard (e.g., a time, team names, single digit numbers, etc.). Second, camera 606 may capture an image and transmit that image to an external device or network for that device or network to run OCR software or use another technique for determining if the camera 606 is pointed at scoreboard 604. For example, the image may be transmitted to a device that allows a user to view the image and determine if camera 606 is pointed at scoreboard 604 such that images captured by camera 606 would include the score and other data on the scoreboard. If the camera 606 is capable, a user may also view a live stream (e.g., video) of the scoreboard from the camera 606 to make a similar type of determination.

If camera 606 is able to determine whether its lens is pointing accurately enough at the scoreboard 604 by itself, then camera 606 may automatically self-adjust, if necessary, to cause camera 606 to be pointed at scoreboard 604. For example, a processor in camera 606 may communicate directly with the mechanism in camera 606 that directs or commands the lens of camera 606 to adjust in a particular way so that it is pointed at scoreboard 604 and may capture the characters on scoreboard 604. If an external device to camera 606 is making that determination, then it may transmit a similar command to camera 606 for camera 606 to execute. The command may include a simple binary command, such as "no" or "0" to indicate to camera 606 that it is not adjusted correctly so as to allow it to capture images with characters from scoreboard 604. In such a situation, camera 606 may then initiate a predetermined adjusting of the camera lens. The command may also include more detailed instructions to command camera 606 of how to adjust its lens, including a direction, an amount (e.g., distance), and/or other information. Camera 606 may be adjusted by physically moving the whole camera (e.g., by a user, manually, or automatically using a motor and a remote control) and/or by moving the lens. Camera 606 may also be adjusted using framing by motorized pan and scan of the camera. Alternatively, the media studio may include or otherwise use camera de-shake routines to offset any movement of the scoreboard camera. Therefore, when OCR or other software is used to determine what alphanumeric characters are being shown at the scoreboard, the pixel data is more intelligible even with a moving or blurry image. Similarly, the media studio can adjust focus and position if the system determines that the framing has shifted from the original setup.

Figure 7:
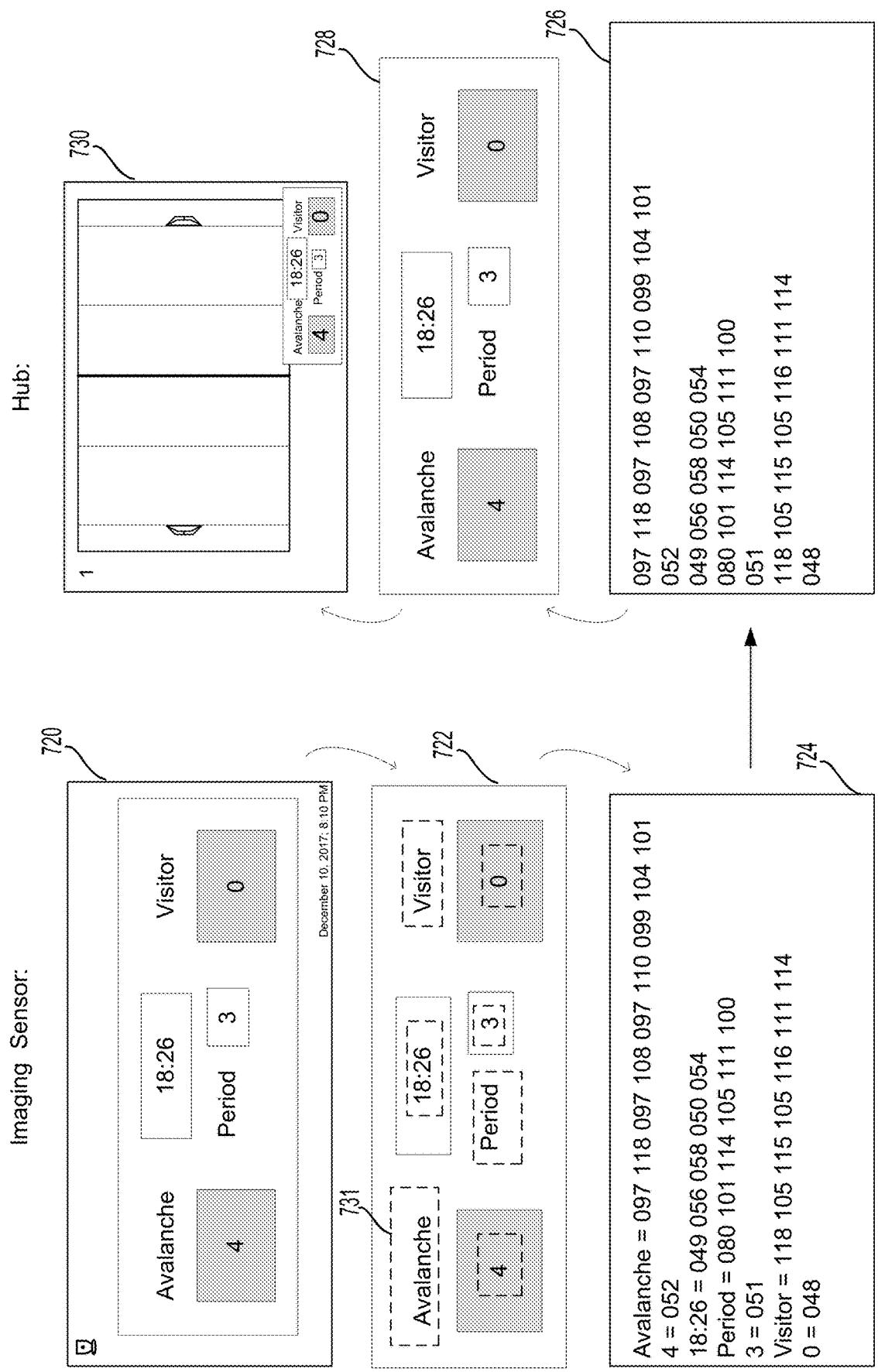
FIG. 7 illustrates a flow diagram including images of an example process executed by the media processing system, according to embodiments of the present technology.

FIG. 7 illustrates a flow diagram including images of an example process executed by the media processing system, according to embodiments of the present technology. Image 720 includes an image captured by a scoreboard camera, such as camera 606 in FIG. 6, and the image includes data presented by the scoreboard. Image 720 shows data associated with the scoreboard such as two scores (score for the Avalanche, and score for the Visitor), a time, and a period, including word descriptors associated with each. The scoreboard camera, or an external device or network, may use the data included in the image to make a determination, or to overlay an image of the scoreboard over a video stream, as described herein.

Image 722 shows the same data associated with the scoreboard as image 720, but includes an outline 731 around each set of alphanumeric characters, which indicates use of an OCR software to allow the camera that captured the image (or an external device that receives that data) to read the alphanumeric characters. Identifying the alphanumeric characters in the image allows for data associated with the image, and therefore the scoreboard, such as the alphanumeric characters to be transmitted to an external device, such as a media studio. For example, the alphanumeric characters in the image may be converted, after they are identified, to ASCII code. Image 724 includes ASCII code associated with each set of alphanumeric characters identified in the image, and therefore from the scoreboard at the time the image was captured. The ASCII code may then be transmitted to another device, such as a media studio, as shown in image 726. The imaging sensor may convert the alphanumeric characters to ASCII before transmitting the data to the media studio for one or more of a variety of reasons. For example, ASCII code associated with alphanumeric characters in an image may require less storage or transmission bandwidth than the image itself. Since the alphanumeric characters are the important data from the image for purposes of overlaying a scoreboard onto a video stream, the media processing system may extract that important information from the image so that it may only have to store or use bandwidth for that information (in ASCII). Conversion to ASCII, for example, allows for the scoreboard data to be converted to a minimum number of bytes so that no or less compression is necessary for transmission. Although in this example the alphanumeric data is converted to ASCII, other code standards or languages may be used.

The media studio may also opportunistically store a time stamped version of the scoreboard data that a user can use for navigating the multicam recordings. For example, if a user wants to jump to every different score throughout a game, any scoreboard score change would indicate such junctures, and the time stamps would allow a user to navigate through them.

After the media studio (i.e., the "hub") receives the ASCII code associated with the alphanumeric characters on the scoreboard, the media studio may generate a digital scoreboard to be overlaid onto a video stream. For example, the media studio may render the received ASCII code into an overlay of graphics. As shown in image 728, a digital scoreboard may be generated from the received ASCII code in image 726. As shown in image 730, the digital scoreboard may be overlaid onto the video stream being viewed at an operator console, such as operator console 95 in FIG. 5. Although in FIG. 7 the digital overlay scoreboard in image 728 appears to be aesthetically similar to the image of the scoreboard in image 728, the digital scoreboard may have a different appearance than that scoreboard. Since the digital scoreboard for overlay is generated only from ASCII code received from the imaging sensor, or generated at the media studio based on an image from the imaging sensor, and predetermined or dynamic rules for how the digital scoreboard should be generated, similar appearance may be coincidental. The appearance of the digital scoreboard may be based on aesthetic factors associated with the video stream, the display used for viewing the video stream, or other factors. After (or before) the digital scoreboard is overlaid onto the video stream, a user may manipulate the scoreboard by switching it on or off, fade it out, move it around, etc.

Display of the scoreboard information may include any number of display techniques including picture-in-picture, split screen or in a dedicated portion of the display device, or an overlay on the audiovisual content including a table or banner, including a scrolling banner, displaying the information. The media studio may render the ASCII data as any visual and artistic styled format based on the graphics renderer in the media studio. For example, after the optical element is recognized and converted into machine language i.e. ASCII, this text can then be presented to the screen in sophisticated ways, such as fonts, 3D, blending, and animation. This may take place in a graphics rendering engine, such as in the media studio. The scoreboard information may be received and/or displayed automatically, based on user profiles or presets, based on system configurations, or the information may be displayed or even provided in response to a control signal received from a mobile device or remote control associated with the electronic device. The displayed information may also be scrolled or adjusted to additional scoreboard information in response to user input, such as with a remote control or mobile device. In this way, the user can minimize the space of the banner, overlay, or portion of the screen dedicated to the fitness information if desired.

Figure 8:
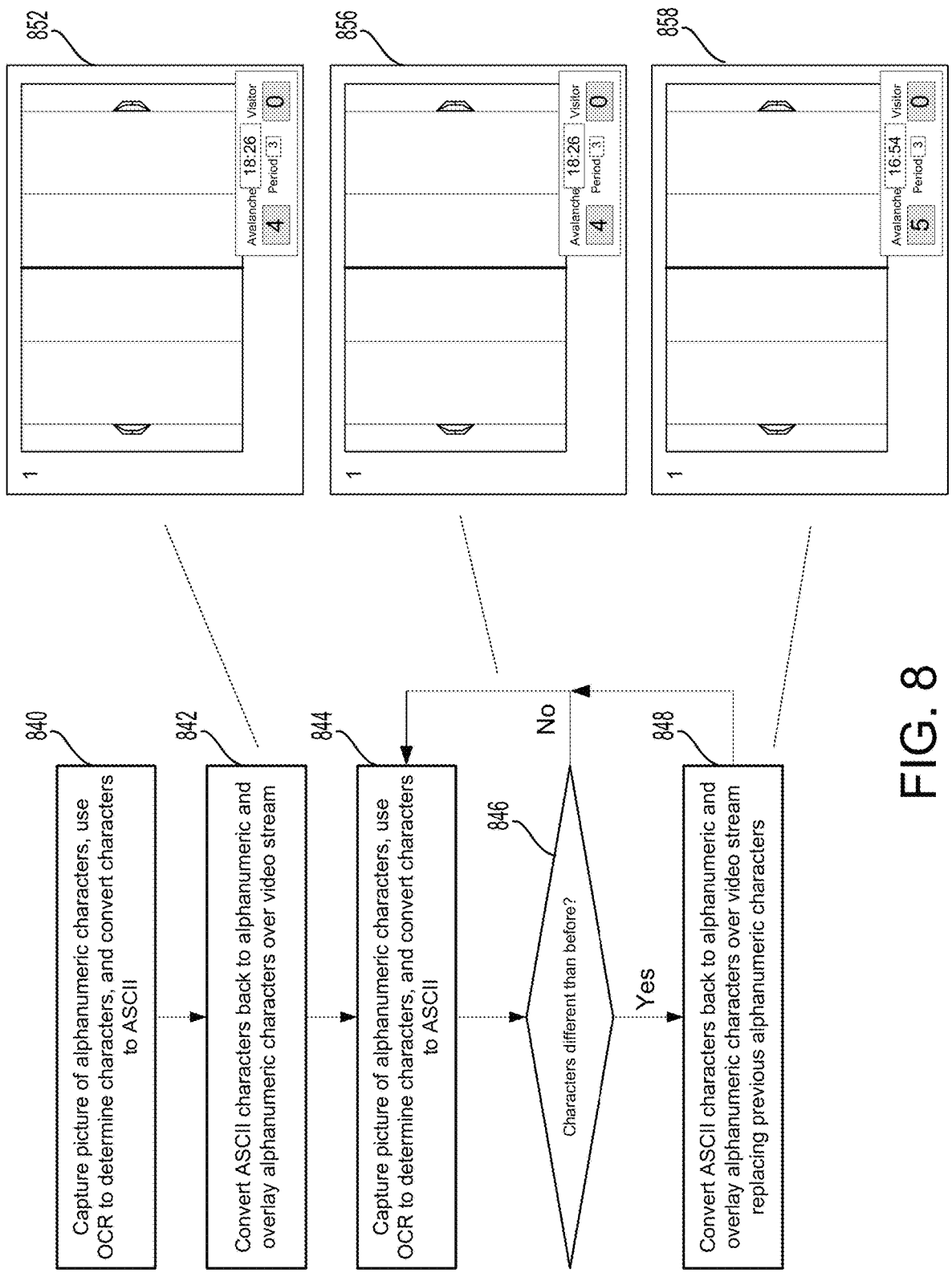
FIG. 8 illustrates a flow chart of an example process executed by the media processing system, according to embodiments of the present technology.

FIG. 8 illustrates a flow chart of an example process executed by the media processing system, according to embodiments of the present technology. As described herein, an imaging sensor may capture an image of a scoreboard and identify the scoreboard data, such as the alphanumeric characters presented on the scoreboard. Furthermore, the imaging sensor may transmit the image or data associated with the image (e.g., the scoreboard data) to a media studio to be used in the media processing system, such as to overlay a scoreboard over a video stream being outputted (e.g., streamed or otherwise transmitted) by the media studio. Since, for example, the video stream may be a live video stream of a sporting event in the environment, it may be important to keep the scoreboard updated for the viewer. Therefore, it may be important to dynamically update the overlaid scoreboard. In order to dynamically update the digital/overlaid scoreboard, the imaging sensor may capture an image of the scoreboard in the environment periodically (e.g., 1 picture per second, 1 picture per a fraction of a second, etc.). However, if the score on the scoreboard hasn't changed since the last time an image of the scoreboard was captured, then it may not be beneficial to transmit data associated with a new image of the scoreboard captured later. Therefore, the imaging sensor (or another, external device) may, in an embodiment, only transmit data associated with a new image of the scoreboard if it determines that the score has changed since the last time it transmitted scoreboard data to the media studio. Refraining from transmitting updated scoreboard data (e.g., in ASCII) when the data is not different (or substantively different with respect to the alphanumeric characters from the scoreboard) may allow the imaging sensor to save battery, device bandwidth, network bandwidth, computational cost, etc. However, the bandwidth or cost saved from not sending such ASCII code may be less than the bandwidth cost saved because of the fact that the data being sent is ASCII and not video or another, larger type of data (e.g., if the camera was sending video data instead of ASCII data to relay the scoreboard characters).

The imaging sensor may accomplish this determination by comparing data associated with a new image of the scoreboard with data associated with a previously captured image of the scoreboard. If the alphanumeric characters of the scoreboard have changed, then the imaging sensor may transmit data associated with the new image to the media studio. If the alphanumeric characters of the scoreboard have not changed, then the imaging sensor may refrain from transmitting data associated with the new image to the media studio. In turn, the media studio may only update the digital scoreboard overlaid onto the video stream when it receives new data associated with a new scoreboard data. The media studio may double-check the new data to determine if it is different than the previous data, or it may just trust that if it is receiving new data, it must be new and it updates the overlaid digital scoreboard. In other words, the media studio may act as a double-check for the imaging sensor and its determination that the scoreboard has changed, or the imaging sensor may be the only device determining whether the scoreboard has changed before the digital scoreboard is changed in the overlay.

Such changes in score (e.g., determined based on machine language/learning, comparison of ASCII codes, etc.) may also assist in production of other types of video streams or video files. For example, once the visual data is converted into machine language (e.g., ASCII), it may be easy for the system to recognize changes in state (such as score). Using this knowledge, tagging or highlight reels could be generated and these tags or highlights could serve as event pointers in the content.

If the event taking place is a timed event (e.g., hockey, basketball, etc.), then the scoreboard may change every second since the timer may count down or up every second. If, on the other hand, the event taking place is not a timed event (e.g., baseball), then the scoreboard may not change every second, and may instead change only after an inning is completed or when a team scores a run. Therefore, the above embodiments may each be available, and applied depending on the type of event taking place in the environment.

Step 840 includes capturing picture of alphanumeric characters, using OCR or other recognition software to determine characters, and converting characters to ASCII or other code or language. For the first image captured by the imaging sensor, after the characters from the scoreboard have been converted, the ASCII characters may be converted back to alphanumeric and overlaid over the video stream by the media studio, as shown in step 842. A screenshot of an example video stream with an overlaid scoreboard is shown in item 852. As shown in screenshot 852, the score is 4-0 Avalanche with 18:26 remaining in the third period. In step 844, step 840 is repeated, or in other words the imaging sensor would capture picture of alphanumeric characters, use OCR or other recognition software to determine characters, and convert characters to ASCII or other code or language. Then, the imaging sensor (or another device or network that has received the scoreboard data from the imaging sensor) may determine if the new image data is different from the data associated with a previous image captured. Specifically, in step 846, the imaging sensor may determine if the characters are different from before. If not, then the process reverts back to step 844 for the imaging sensor to capture another image, determine the characters in the image, and convert the characters to ASCII. A screenshot of an example video stream with an overlaid scoreboard is shown in item 856. As shown in screenshot 854, the score is still 4-0 Avalanche with 18:26 remaining in the third period. As compared to the previous image, the score, period, and time remaining is the same. If so, then the process moves to step 848, where the media studio may convert ASCII characters back to alphanumeric and overlay the alphanumeric characters over the video stream, replacing previously overlaid alphanumeric characters to update the digital scoreboard. A screenshot of an example video stream with an overlaid scoreboard is shown in item 858. As shown in screenshot 858, the score is 5-0 Avalanche with 16:54 remaining in the third period. As compared to the previous image, the score and time remaining has changed. Therefore, the media processing system (e.g., media studio) may go through the process of updating the digital scoreboard overlaid on the video stream.

The above process may include all of the described steps, or may only include a subset of them. For example, the imaging sensor may be able to compare the alphanumeric characters from the image it captured of the scoreboard without converting the alphanumeric characters to ASCII or another code or language first. Therefore, the imaging sensor (or other device completing this step) may wait to convert the alphanumeric characters to ASCII until after it has determined that the characters are different from the characters in the previously captured image, or in other words until after it has determined that the scoreboard has changed and the digital overlaid scoreboard should be updated.

Delay may be inherent in one or more of the above processes. For example, delay may exist during the time it takes the imaging sensor to capture the image, to OCR and/or convert the data to ASCII or other small data, transmit the data to the media studio, render the data back to alphanumeric and generate a digital scoreboard, and/or overlay the digital scoreboard onto the video stream. There also may be delays inherent in just updating the already-overlaid scoreboard (i.e., updating the video stream). However, this delay may be determined by the media studio or other devices because it is known, and should be substantially consistent each time the process occurs. In another embodiment, a user or the devices by themselves may test the devices to determine the delay, for example by analyzing a certain period of time during which a network video camera and imaging sensor are being used, pausing both cameras and comparing the time on the scoreboard (or another) clock or by using other timestamp methods. The delay may also be determined for each step in the process individually. Either way, the deterministic delay may be incorporated back into the process (e.g., delaying the video stream so that the overlaid scoreboard is accurate based on the current time in the streaming video).

Figure 9:
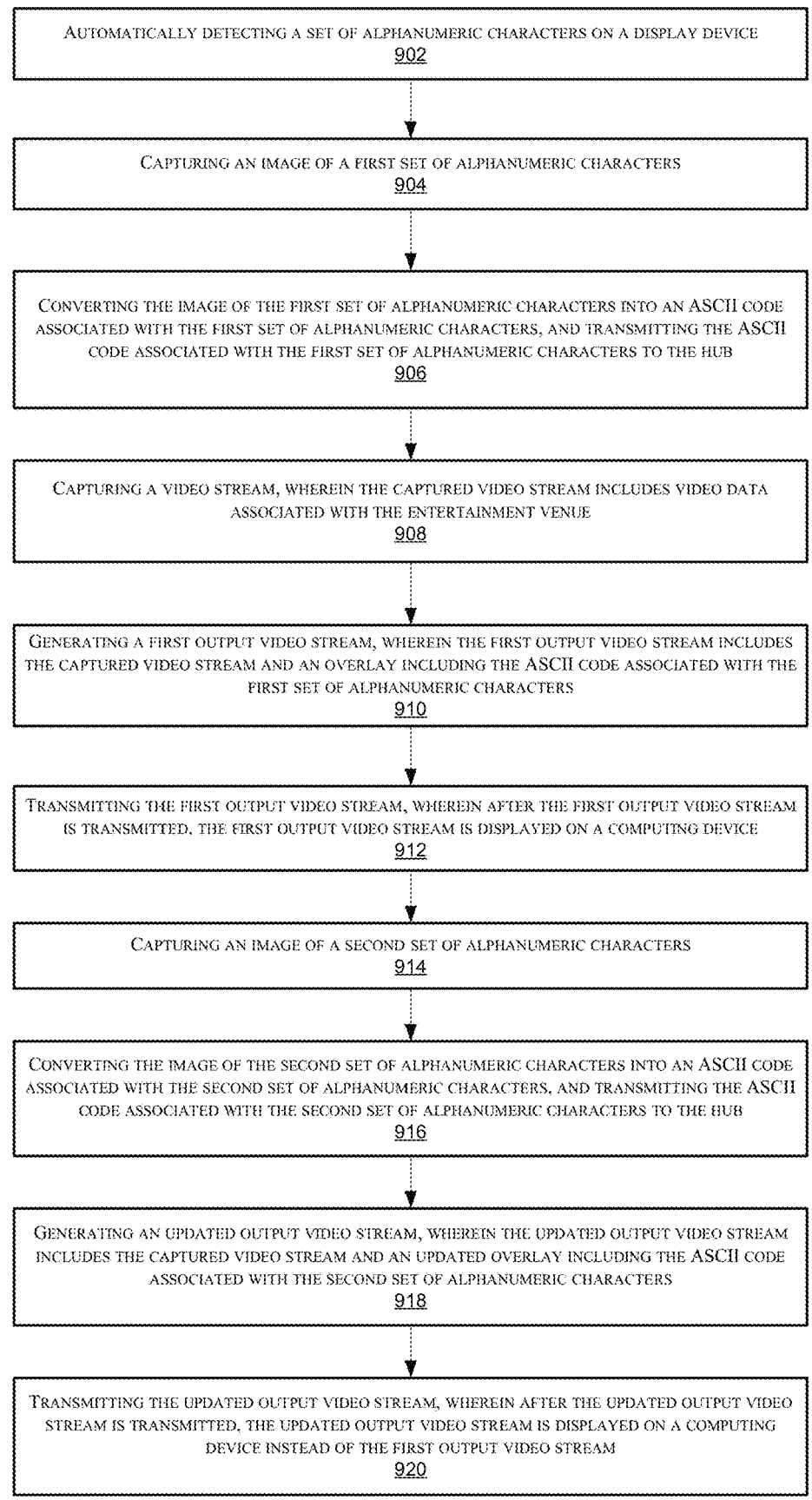
FIG. 9 includes a flow chart illustrating an example process of overlaying a digital scoreboard onto a video stream using an imaging sensor capturing images of a live scoreboard, according to embodiments of the present technology.

FIG. 9 includes a flow chart illustrating an example process of overlaying a digital scoreboard onto a video stream using an imaging sensor capturing images of a live scoreboard, according to embodiments of the present technology. Step 902 includes, for example, automatically detecting, at an imaging sensor on a network located in an environment of an entertainment venue, a set of alphanumeric characters on a display device. Step 904 includes, for example, capturing, using the imaging sensor, an image of a first set of alphanumeric characters. Step 906 includes, for example, converting the image of the first set of alphanumeric characters into an ASCII code associated with the first set of alphanumeric characters, and transmitting the ASCII code associated with the first set of alphanumeric characters to a hub on the network. Step 908 includes, for example, capturing, using a video capture device located in the environment, a captured video stream, wherein the captured video stream includes video data associated with the entertainment venue. Step 910 includes, for example, generating, using the hub, a first output video stream, wherein the first output video stream includes the captured video stream and an overlay including the ASCII code associated with the first set of alphanumeric characters. Step 912 includes, for example, transmitting, using the hub, the first output video stream, wherein after the first output video stream is transmitted, the first output video stream is displayed on a computing device. Step 914 includes, for example, capturing, using the imaging sensor, an image of a second set of alphanumeric characters. Step 916 includes, for example, converting the image of the second set of alphanumeric characters into an ASCII code associated with the second set of alphanumeric characters, and transmitting the ASCII code associated with the second set of alphanumeric characters to the hub. Step 918 includes, for example, generating, using the hub, an updated output video stream, wherein the updated output video stream includes the captured video stream and an updated overlay including the ASCII code associated with the second set of alphanumeric characters. And step 920 includes, for example, transmitting, using the hub, the updated output video stream, wherein after the updated output video stream is transmitted, the updated output video stream is displayed on a computing device instead of the first output video stream.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A computer-implemented method, comprising:
receiving, by a hub, first data representing live action alphanumeric text converted from a first image of an entertainment venue captured by an imaging sensor located in an environment of the entertainment venue, the live action alphanumeric text describing an event occurring in the environment at a first time;
receiving, by the hub from a video capture device located in the environment, a captured video stream, wherein the captured video stream includes video data of the event;
generating, using the hub, an output video stream, wherein the first output video stream includes an aggregated media item having the captured video stream and an overlay graphically representing the live action alphanumeric text, the overlay generated by the hub using the first data representing the live action alphanumeric text;
transmitting, using the hub, the output video stream for display on a computing device.

2. The method of claim 1, further comprising:
automatically adjusting, using a hub, a lens of the imaging sensor located in the environment, wherein after the lens of the imaging sensor is adjusted, the imaging sensor is configured to capture images of the set of alphanumeric characters.

3. The method of claim 1, further comprising:
converting the image into the data by detecting the live action alphanumeric text using optical character recognition.

4. The method of claim 1, wherein the hub, the imaging sensor, and the video capture device are communicatively connected to each other via a private local network.

5. The method of claim 1, wherein the first data comprises ASCII code representing the live action alphanumeric text.

6. The method of claim 1, further comprising:
receiving, by the hub, second data representing the live action alphanumeric text converted from a second image of the entertainment venue captured by the imaging sensor at a second time subsequent to the first time;
determining a change in the live action alphanumeric text by comparing the second data with the first data;
generating an updated overlay, by the hub, in accordance with the determining, such that the output video stream includes the aggregated media item to have the captured video stream and the updated overlay graphically representing the change in the live action alphanumeric text.

7. The method of claim 6, wherein the determining comprises:
generating a first set of alphanumeric characters from the first data;
generating a second set of alphanumeric characters from the second data; and
comparing, at the hub, the first set of alphanumeric characters and second set of alphanumeric characters to determine whether the alphanumeric characters have changed over time.

8. The method of claim 1, wherein:
the receiving the captured video stream comprises receiving, by the hub from a plurality of video capture devices located in the environment and positioned differently with respect to the event, a plurality of captured video streams, each including respective video data of the event, the captured video stream being a selected one of the plurality of captured video streams to include in the output video stream.

9. A computing device, comprising:
one or more processors; and
a memory having instructions stored thereon, which when executed by the one or more processors, cause the computing device to perform operations including:
receiving first data representing live action alphanumeric text converted from a first image of an entertainment venue captured by an imaging sensor located in an environment of the entertainment venue, the live action alphanumeric text describing an event occurring in the environment at a first time;
receiving, from a video capture device located in the environment, a captured video stream, wherein the captured video stream includes video data of the event;
generating an output video stream, wherein the output video stream includes an aggregated media item having the captured video stream and an overlay graphically representing the live action alphanumeric text, the overlay generated by the hub using the first data representing the live action alphanumeric text;
transmitting the output video stream for display on a computing device.

10. The computing device of claim 9, wherein the instructions further comprise:
automatically adjusting a lens of the imaging sensor located in the environment, wherein after the lens of the imaging sensor is adjusted, the imaging sensor is configured to capture images of the set of alphanumeric characters.

11. The computing device of claim 9, wherein the instructions further comprise:
converting the image into the data by detecting the live action alphanumeric text using optical character recognition.

12. The computing device of claim 9, wherein the imaging sensor, and the video capture device are communicatively connected to each other via a private local network.

13. The computing device of claim 9, wherein the first data comprises ASCII code representing the live action alphanumeric text.

14. The computing device of claim 9, wherein the instructions further comprise:
receiving second data representing the live action alphanumeric text converted from a second image of the entertainment venue captured by the imaging sensor at a second time subsequent to the first time;
determining a change in the live action alphanumeric text by comparing the second data with the first data; and
generating an updated overlay in accordance with the determining, such that the output video stream includes the aggregated media item to have the captured video stream and the updated overlay graphically representing the change in the live action alphanumeric text.

15. The computing device of claim 14, wherein the determining comprises:
generating a first set of alphanumeric characters from the first data;
generating a second set of alphanumeric characters from the second data; and
comparing, the first set of alphanumeric characters and second set of alphanumeric characters to determine whether the alphanumeric characters have changed over time.

16. The computing device of claim 9, wherein:
the receiving the captured video stream comprises receiving, from a plurality of video capture devices located in the environment and positioned differently with respect to the event, a plurality of captured video streams, each including respective video data of the event, the captured video stream being a selected one of the plurality of captured video streams to include in the output video stream.

* * * * *